(12) United States Patent
Shimizu et al.

(10) Patent No.: US 6,715,578 B2
(45) Date of Patent: Apr. 6, 2004

(54) CABLE STEERING SYSTEM

(75) Inventors: Yasuo Shimizu, Wako (JP); Katsuhiro Sakai, Wako (JP); Atsuhiko Yoneda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/306,111

(22) Filed: Nov. 27, 2002

(65) Prior Publication Data

US 2003/0127276 A1 Jul. 10, 2003

(30) Foreign Application Priority Data

Dec. 3, 2001 (JP) .......................................... 2001-368913

(51) Int. Cl.$^7$ ................................................ B62D 1/00
(52) U.S. Cl. ...................................... 180/444; 180/443
(58) Field of Search ................................ 180/443, 444, 180/446; 74/502.4, 505, 506; 701/41, 42

(56) References Cited

U.S. PATENT DOCUMENTS 5,924,520 A * 7/1999 Ehara et al. ................. 180/444
6,053,274 A * 4/2000 Ehara et al. ................. 180/444
6,161,645 A * 12/2000 Tabata et al. ................ 180/444

FOREIGN PATENT DOCUMENTS

JP          8-2431          9/1996

* cited by examiner

*Primary Examiner*—Lesley D. Morris
*Assistant Examiner*—L. Lum
(74) *Attorney, Agent, or Firm*—Merchant & Gould, P.C.

(57) ABSTRACT

A cable steering system is provided in which first control means controls the operation of a power steering motor disposed between Bowden cables and wheels based on a steering torque detected by a steering torque detection means disposed between a steering wheel and the Bowden cables, and a second control means controls the operation of a steering reaction force addition motor that applies a steering reaction torque to the steering wheel. It is possible to prevent deterioration of the steering feel by generating a steering reaction torque by the steering reaction force addition motor so as to compensate for a change in the steering torque while regulating the change in steering responsiveness due to expansion and contraction of the Bowden cables by generating an assist torque by the power steering motor so as to change the steering torque.

6 Claims, 8 Drawing Sheets

CABLE STEERING SYSTEM

BACKGROUND OF THE INVENTION

1. Technical Field of the Invention

The present invention relates to a cable steering system in which a steering wheel and a steering gearbox are connected together via a cable such as a Bowden cable.

2. The Prior Art

In a conventional vehicle steering system, a steering shaft has a steering wheel at its upper end and is connected to a steering gearbox at its lower end, and a steering torque that is input into the steering wheel is transmitted via the steering shaft to a rack-and-pinion mechanism disposed within the steering gearbox.

However, when the steering wheel and the steering gearbox are connected together using the steering shaft, since it is difficult to freely choose the position of the steering wheel relative to the position of the steering gearbox, not only are the degrees of freedom of the design greatly restricted, but there is also the problem that the steering gearbox cannot be shared between a right-hand drive vehicle and a left-hand drive vehicle. Moreover, since vibration input into a tire from the road surface and vibration of an engine are input into the steering wheel via the steering shaft, there is the problem that the vibrations might deteriorate the quietness of the passenger compartment and the ride quality.

A cable steering system employing flexible transmission means such as a Bowden cable instead of the conventional steering shaft has therefore been proposed (Japanese Patent Application Laid-open No. 8-2431). Employing such a cable steering system enables the position of the steering wheel relative to the position of the steering gearbox to be freely chosen and, moreover, since it is then difficult for the vibration of the steering gearbox to be transmitted to the steering wheel, each of the above-mentioned problems can be solved.

Furthermore, an electric power steering system is also known that assists a driver's steering operation by detecting the steering torque that is input into the steering wheel by the driver and driving an assist motor based on the steering torque.

In a cable steering system having such an arrangement, since the cable expands and contracts when a steering torque is transmitted, it is impossible to prevent the transmission rigidity of the steering torque from becoming lower than that of a shaft type steering system in which a steering wheel and a steering gearbox are connected together via a steering shaft. As a result, a time lag occurs between the time when the steering wheel is operated and the time when the vehicle wheels are turned for steering, thereby degrading the steering responsiveness, and there is a possibility that the driver might experience an unpleasant sensation.

In order to solve this problem, if the steering assist power in the power steering system is made larger than usual, the driver is required to input a smaller steering torque into the steering wheel, and there is therefore less expansion and contraction of the Bowden cable, thereby decreasing the steering time lag. However, when this method is employed, the steering torque required of the driver can become too small, resulting in the problem that the steering feel might deteriorate.

The present invention has been carried out in view of such circumstances, so as to prevent any deterioration of the steering feel while enhancing the steering responsiveness in a cable steering system provided with assist means.

SUMMARY OF THE INVENTION

In accordance with a first aspect of the present invention, a cable steering system includes a cable that transmits to a steering gearbox a steering torque applied to a steering wheel, steering torque detection means that detects the steering torque, assist means disposed between the cable and a wheel, the assist means assisting a steering operation by a driver, and first control means that controls operation of the assist means based on the steering torque, wherein the system further includes steering reaction force addition means disposed between the steering wheel and the cable, the steering reaction force addition means applying a steering reaction torque to the steering wheel, and second control means that controls operation of the steering reaction force addition means, the steering torque detection means being disposed between the steering wheel and the cable.

In accordance with this arrangement, the first control means controls the operation of the assist means disposed between the cable and the wheel based on the steering torque detected by the steering torque detection means disposed between the steering wheel and the cable, and the second control means controls the operation of the steering reaction force addition means that applies a steering reaction torque to the steering wheel. Therefore, it is possible to prevent deterioration of the steering feel by compensating for a change in the steering torque by generating a steering reaction torque in the steering reaction force addition means while regulating the change in steering responsiveness due to expansion and contraction of the cable by generating an assist torque in the assist means so as to change the steering torque.

Furthermore, in accordance with a second aspect of the present invention, in addition to the arrangement of the first aspect, there is proposed a cable steering system wherein, in a low vehicle speed region, the first control means controls the assist means so as to increase an assist torque and the second control means controls the steering reaction force addition means so as to increase the steering reaction torque and, in a high vehicle speed region, the first control means controls the assist means so as to decrease the assist torque and the second control means controls the steering reaction force addition means so as to decrease the steering reaction torque.

In accordance with this arrangement, in the low vehicle speed region, the assist torque due to the assist means is increased and the steering reaction torque due to the steering reaction force addition means is increased. Therefore, it is possible to prevent the steering wheel from becoming too light while enhancing the steering responsiveness. Furthermore, in the high vehicle speed region, the assist torque due to the assist means is decreased and the steering reaction torque due to the steering reaction force addition means is decreased. Therefore, it is possible to prevent the steering wheel from becoming too heavy while enhancing the handling stability.

Moreover, in accordance with a third aspect of the present invention, in addition to the arrangement of the first aspect or the arrangement of the second aspect, there is proposed a cable steering system wherein, when the vehicle is at a standstill, the steering reaction force addition means assists a steering operation by the driver in cooperation with the assist means.

In accordance with this arrangement, since the steering operation by the driver is assisted by the steering reaction force addition means in cooperation with the assist means when turning the steering wheel when the vehicle is at a standstill, the steering wheel can be made light, thereby alleviating the load imposed on the driver.

Furthermore, in accordance with a fourth aspect of the present invention, in addition to the arrangement of the first aspect, there is proposed a cable steering system wherein the steering torque detection means is disposed between the steering wheel and the steering reaction force addition means.

In accordance with this arrangement, since the steering torque detection means is disposed between the steering wheel and the steering reaction force addition means, variation of the positions at which the steering torque detection means is mounted can be increased.

Moreover, in accordance with a fifth aspect of the present invention, in addition to the arrangement of the first aspect, there is proposed a cable steering system wherein the steering torque detection means is disposed between the steering reaction force addition means and the cable.

In accordance with this arrangement, since the steering torque detection means is disposed between the steering reaction force addition means and the cable, variation of the positions at which the steering torque detection means is mounted can be increased.

Bowden cables 5, 6 of embodiments correspond to the cable of the present invention, a steering reaction force addition motor 17 of the embodiments corresponds to the steering reaction force addition means of the present invention, and a power steering motor 24 of the embodiments corresponds to the assist means of the present invention.

Modes for carrying out the present invention are explained below by reference to the embodiments of the present invention illustrated in the attached drawings.

BRIEF DESCRIPTION OF THE DRAWINGS

FIG. 1 is an overall perspective view of a cable steering system.

FIG. 2 is a magnified cross section along line 2—2 in FIG. 1.

FIG. 3 is a magnified cross section along line 3—3 in FIG. 2.

FIG. 4 is a cross section along line 4—4 in FIG. 2.

FIG. 5 is a magnified cross section along line 5—5 in FIG. 1.

FIG. 6 is a graph for explaining control of the power steering motor and the steering reaction force addition motor in response to the vehicle speed.

DETAILED DESCRIPTION OF THE INVENTION

Figure 1:
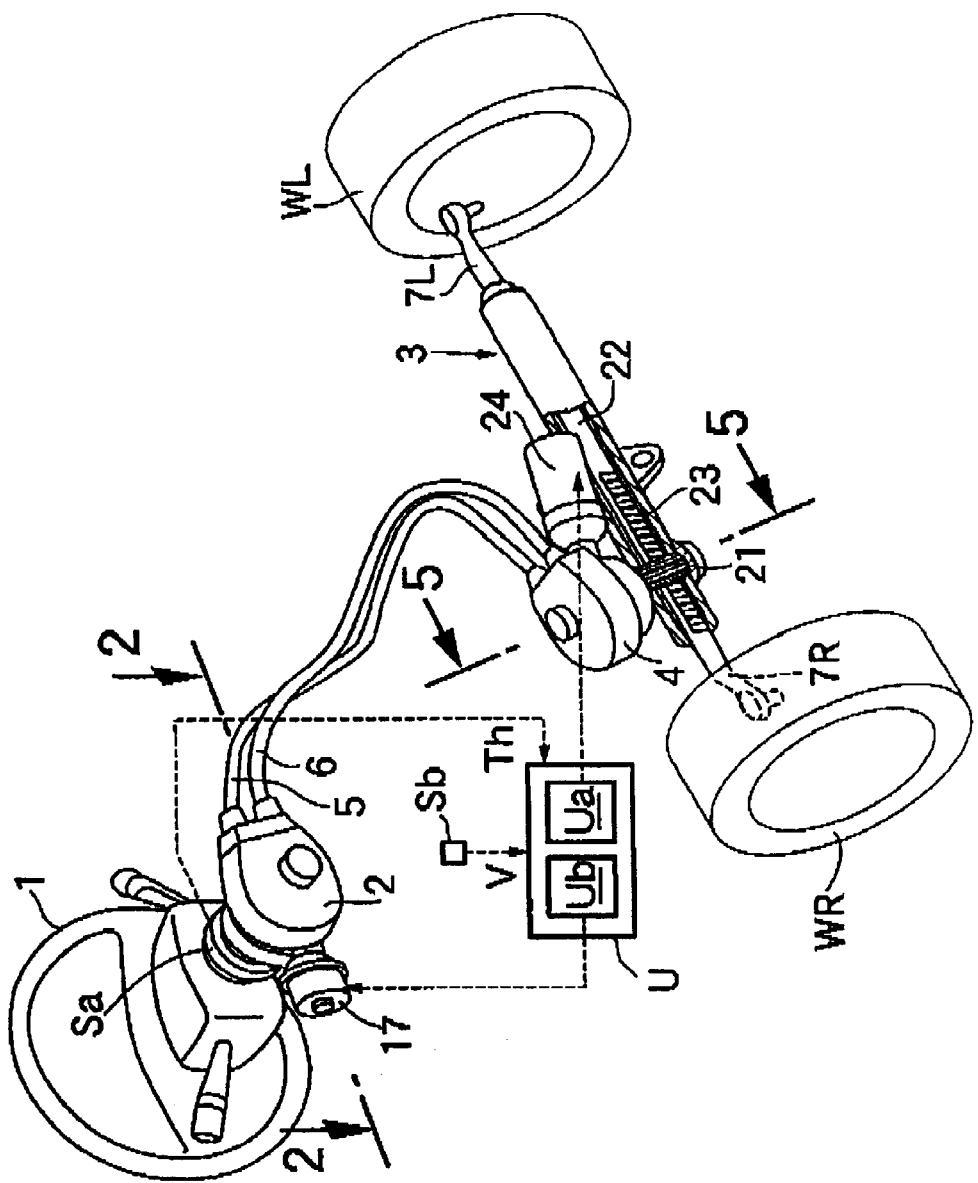
FIGS. 1 to 6 show a first embodiment of the present invention.

As shown in FIG. 1, a drive pulley housing 2 provided forward of a steering wheel 1 of a motor vehicle and a driven pulley housing 4 provided above a steering gearbox 3 are connected together by two Bowden cables 5, 6. Tie rods 7L, 7R extending in the lateral direction of the vehicle body from opposite ends of the steering gearbox 3 are connected to knuckles (not illustrated) supporting left and right wheels WL, WR.

Figure 2:
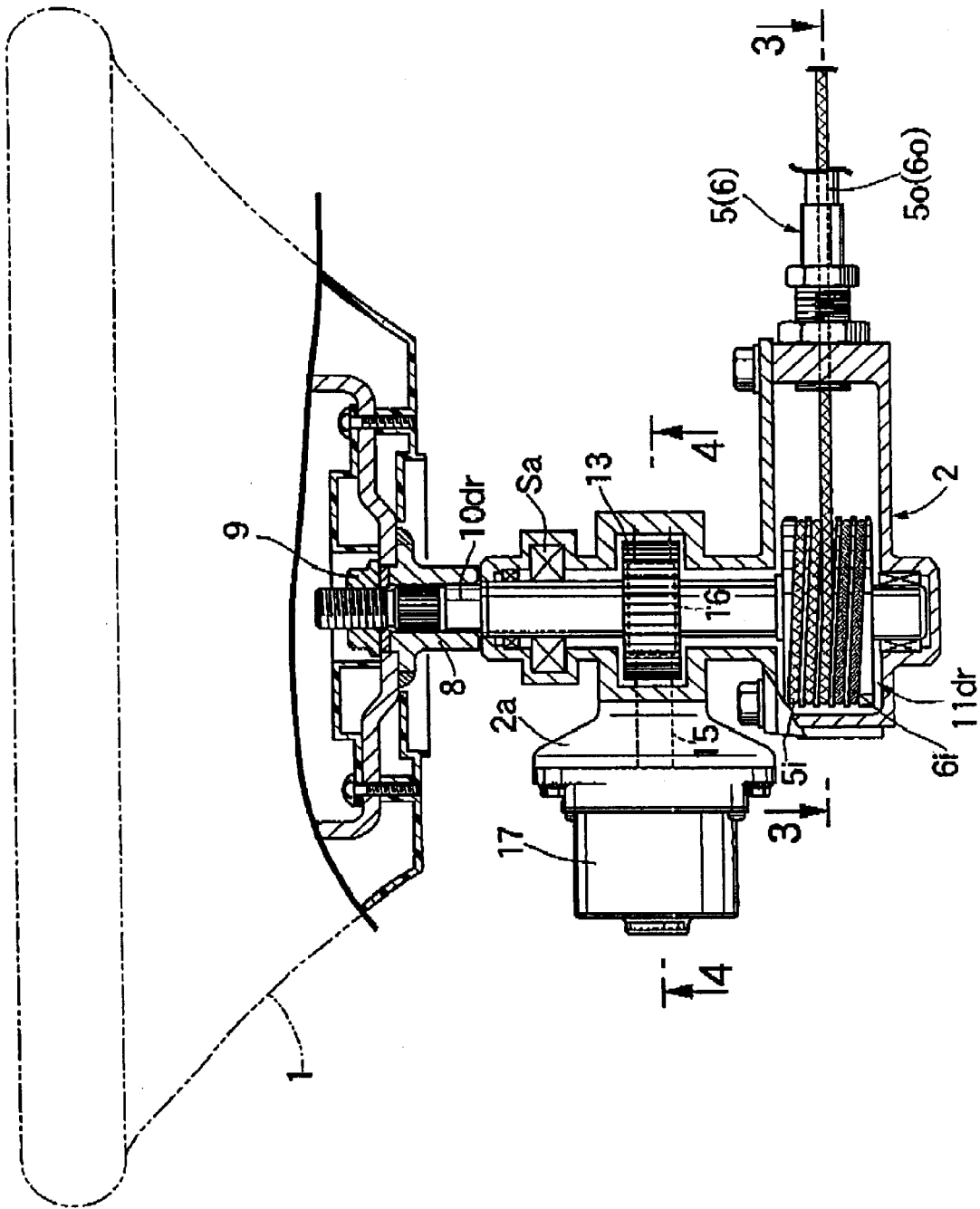
Figure 3:
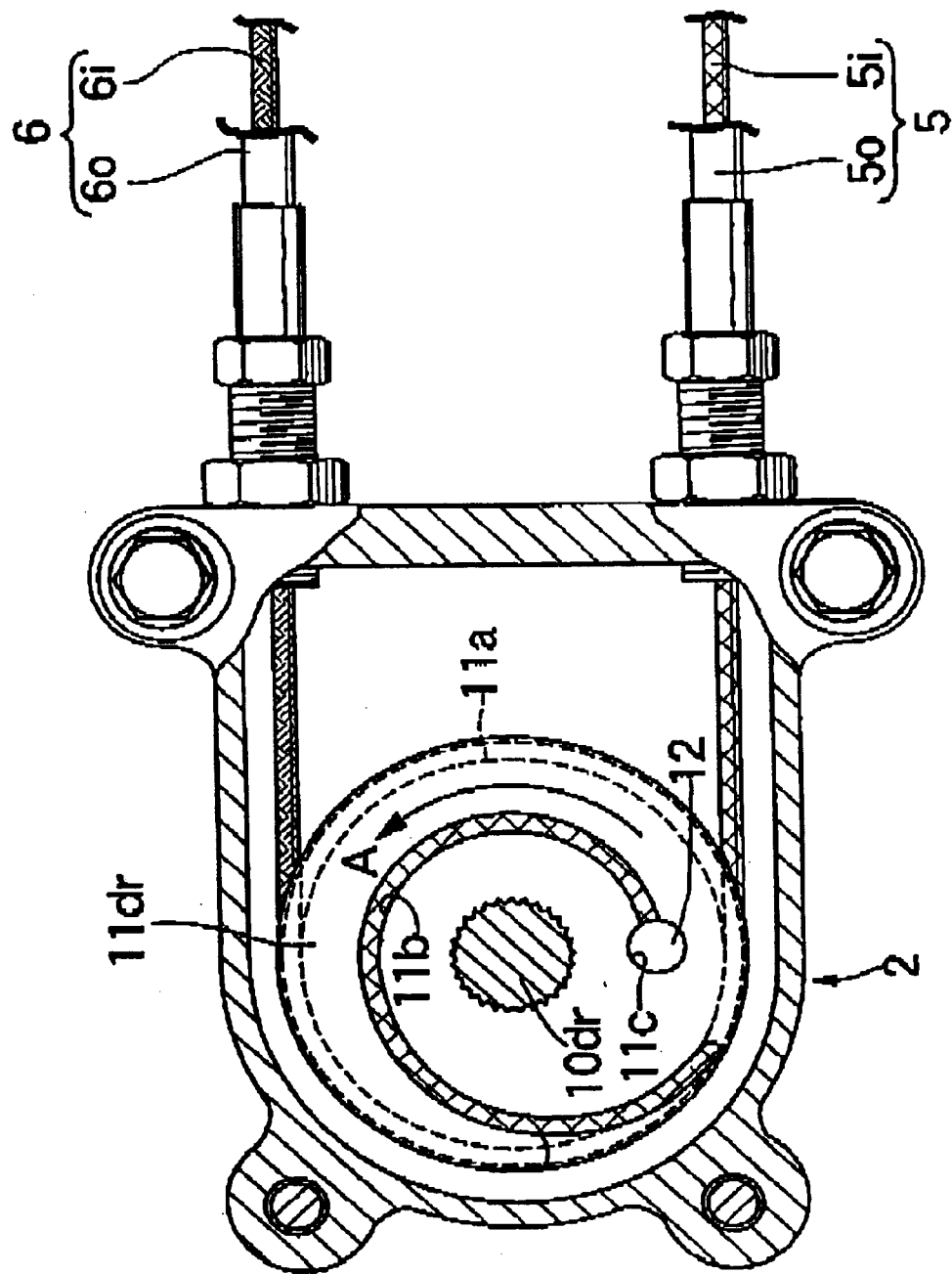
Figure 4:
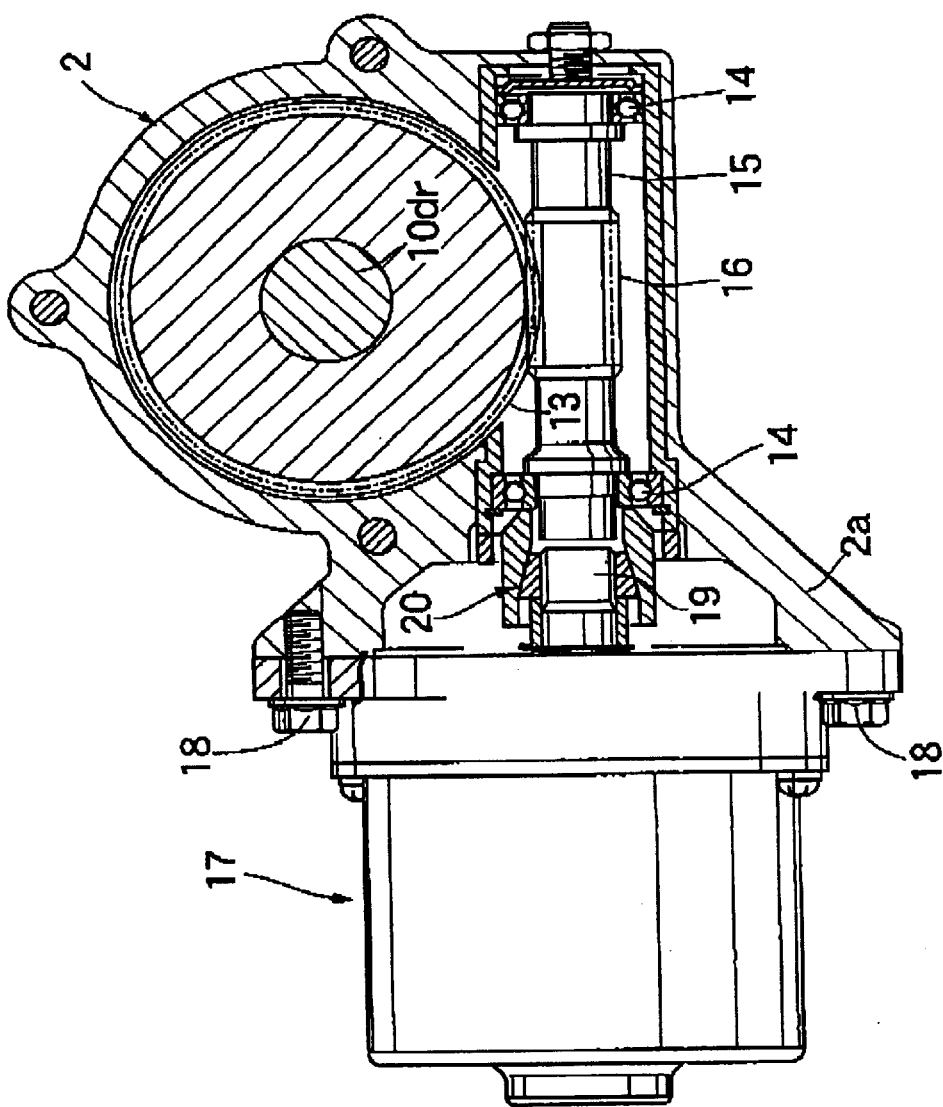

As shown in FIGS. 2 to 4, a rotary shaft 10$dr$ fixed to a boss 8 of the steering wheel 1 by a nut 9 is rotatably supported in the drive pulley housing 2, and a drive pulley 11$dr$ is fixed around the rotary shaft 10$dr$. The two Bowden cables 5, 6 are formed from outer tubes 5$o$, 6$o$ and inner cables 5$i$, 6$i$ that are housed slidably within the outer tubes 5$o$, 6$o$. Formed on the outer peripheral surface of the drive pulley 11$dr$ is one helical-shaped pulley groove 11$a$. Formed on opposite end surfaces of the drive pulley 11$dr$ are spiral-shaped cable guide grooves 11$b$ communicating with opposite ends of the pulley groove 11$a$, and pin holes 11$c$ communicating with the cable guide grooves 11$b$.

Pins 12 are fixed to one end of each of the inner cables 5$i$, 6$i$ of the Bowden cables 5, 6 and press-fitted into the pin holes 11$c$ of the drive pulley 11$dr$, and the inner cables 5$i$, 6$i$ are then wound along the pulley groove 11$a$ from the cable guide grooves 11$b$ and pulled out from radially opposite ends of the drive pulley 11$dr$ toward substantially the same direction.

A worm wheel 13 is fixed to the rotary shaft 10$dr$ of the drive pulley 11$dr$. The worm wheel 13 is meshed with a worm 16 formed integrally with a drive shaft 15 supported in the drive pulley housing 2 via a pair of ball bearings 14. A steering reaction force addition motor 17 is fixed by bolts 18 to a motor support part 2$a$ provided on the drive pulley housing 2, and an output shaft 19 for the steering reaction force addition motor 17 and the drive shaft 15 are connected together via a torque limiter 20. Steering torque detection means Sa is disposed on the outer periphery of the rotary shaft 10$dr$ at a position between the steering wheel 1 and the worm wheel 13.

Figure 5:
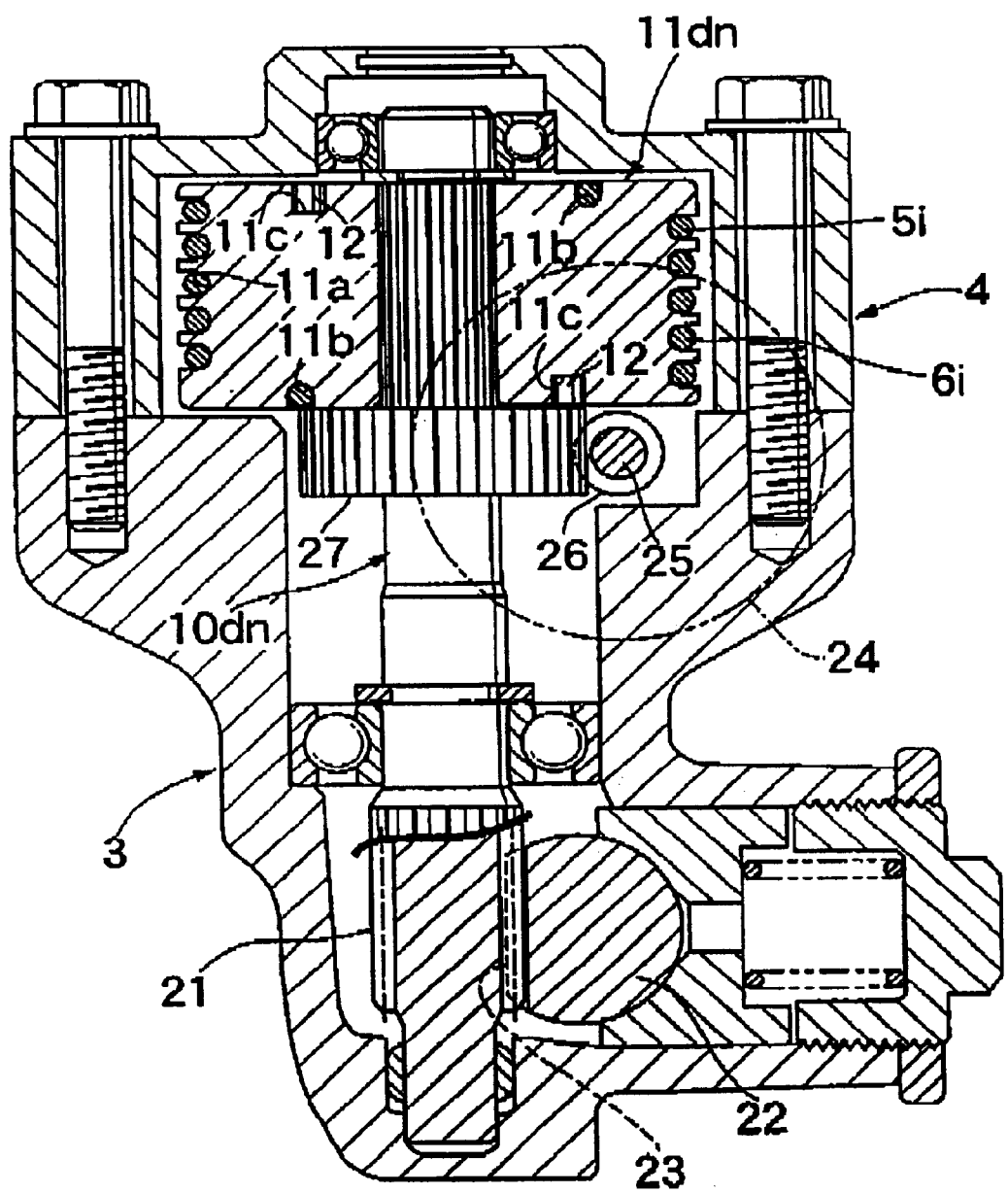

As shown in FIGS. 1 and 5, a driven pulley 11$dn$ is fixed to a rotary shaft 10$dn$ rotatably supported in the driven pulley housing 4. The winding and fixing structures of the two inner cables 5$i$, 6$i$ to the driven pulley 11$dn$ are identical to those for the drive pulley 11dr explained by reference to FIGS. 2 and 3. That is, pins 12 are fixed to the other end of each of the inner cables 5$i$, 6$i$ and press-fitted into pin holes 11$c$ of the driven pulley 11$dn$, and the inner cables 5$i$, 6$i$ extending to the pins 12 are wound along spiral cable guide grooves 11$b$ formed on end surfaces of the driven pulley 11$dn$ and a helical pulley groove 11$a$ formed on the outer peripheral surface of the driven pulley 11$dn$.

A pinion 21 is provided on the extremity of the rotary shaft 10$dn$ projecting into the interior of the steering gearbox 3 from the driven pulley housing 4. The pinion 21 meshes with a rack 23 formed on a steering rod 22 laterally and slidably supported within the steering gearbox 3. A power steering motor 24 is supported on the driven pulley housing 4. A worm 26 provided around an output shaft 25 within the driven pulley housing 4 meshes with a worm wheel 27 provided around the rotary shaft 10$dn$. The torque of the power steering motor 24 is therefore transmitted to the rotary shaft 10$dn$ via the worm 26 and the worm wheel 27.

Returning to FIG. 1, an electronic control unit U includes a first control unit Ua and a second control unit Ub. Input into the electronic control unit U are a steering torque Th that is detected by the steering torque sensor Sa and a vehicle speed V that is detected by a vehicle speed sensor Sb. The first control unit Ua controls the operation of the power steering motor 24, and the second control unit Ub controls the operation of the steering reaction force addition motor 17.

The action of the embodiment of the present invention having the above-mentioned arrangement is now explained.

When the steering wheel 1 is operated so as to turn the vehicle and, for example, the rotary shaft 10$dr$ is rotated in direction A in FIG. 3, the inner cable 6i of one of the Bowden cables 5, 6 wound around the drive pulley 11dr is pulled and the other inner cable 5i is loosened, so that rotation of the drive pulley 11dr is thereby transmitted to the driven pulley 11dn. As a result, the rotary shaft 10dn of the driven pulley 11dn shown in FIG. 5 rotates, and a steering torque is transmitted to the wheels WL, WR via the pinion 21, the rack 23, and the steering rod 22 within the steering gearbox 3.

At this point, a torque is generated in the power steering motor 24 so as to assist the driver's steering operation, and the steering reaction force addition motor 17 is operated so as to apply a steering reaction force to the steering wheel 1.

Next, overall control of the steering reaction force addition motor 17 and the power steering motor 24 is explained. Here, the steering torque that is input into the steering wheel 1 by the driver is called Th, the assist torque that is generated by the power steering motor 24 is called Ta, and the steering reaction torque that is generated by the steering reaction force addition motor 17 is called Tr.

When the driver operates the steering wheel 1 so as to turn the wheels WL, WR, a road surface reaction torque Tw in a direction that turns back the wheels WL, WR is applied to the pinion 21 of the steering gearbox 3. In order to turn the wheels WL, WR against this road surface reaction torque Tw, each of the torques is generated so as to satisfy the equation below.

$$Tw=Th+Ta-Tr \quad (1)$$

In equation (1), the symbols of Th and Ta are positive in the turning direction, and the symbol of Tr is positive in the direction opposite to the turning direction.

First, in the case of manual steering where the assist torque Ta=0 and the steering reaction torque Tr=0, since Tw=Th, when the twist rigidity of the Bowden cables 5, 6 (strictly speaking, the twist rigidity of the steering wheel 1 due to the expansion rigidity of the Bowden cables 5, 6) is defined as Ks, the twist angle $\theta$ of the Bowden cables 5, 6 (strictly speaking, the twist angle of the steering wheel 1 due to the expansion of the Bowden cables 5, 6) can be obtained from $\theta$=Tw/Ks.

Next, when the assist torque Ta is applied by the power steering motor 24 while maintaining the steering reaction torque Tr from the steering reaction force addition motor 17 at 0, Tw becomes equal to Th+Ta. At this point, if the assist torque Ta is set at, for example, one half of the steering torque Th (Tw) when steering manually, that is, it is set so that Ta=Th/2=Tw/2, the steering torque Th satisfies the equation Th=Tw−Ta=Tw−Tw/2=Tw/2 and can thus be reduced to one half of its value when steering manually. As a result, the twist angle $\theta$ of the Bowden cables 5, 6 also satisfies the equation $\theta$=(Tw/2)/Ks and can thus be reduced to one half of its value when steering manually.

In this way, when the assist torque Ta is increased, it is accompanied by a decrease in the steering torque Th, and it is therefore possible to enhance the steering responsiveness by decreasing the twist angle $\theta$ of the Bowden cables 5, 6. When, in order to further decrease the twist angle $\theta$ of the Bowden cables 5, 6, the assist torque Ta is further increased to satisfy the equation Ta=(¾)Th=(¾)Tw, the steering torque Th satisfies the equation Th=Tw−Ta=Tw−(¾)Tw=Tw/4, thus reducing the steering torque Th to one fourth of its value when steering manually. As a result, the twist angle $\theta$ of the Bowden cables 5, 6 can be reduced so as to satisfy the equation $\theta$=(Tw/4)/Ks, which is one fourth of its value when steering manually.

However, when the assist torque Ta is increased so as to decrease the steering torque Th, the steering wheel 1 becomes too light, the steering reaction force becomes insufficient, and there is the problem that the steering feel deteriorates. In the example described above, setting the twist angle $\theta$ of the Bowden cables 5, 6 at one half of the twist angle $\theta$ when steering manually halves the steering torque Th, and setting it at one quarter thereof reduces the steering torque Th to one quarter. In order to solve the problem of the deterioration in steering feel, a steering reaction torque Tr is generated by the steering reaction force addition motor 17, thus making the steering wheel 1 heavy.

A state in which the twist angle $\theta$ of the Bowden cables 5, 6 is one quarter of the twist angle $\theta$ when steering manually and the steering torque Th is one half of the steering torque Th when steering manually, is considered to be a state in which the twist angle $\theta$ of the Bowden cables 5, 6 is adequately small and the steering wheel 1 has appropriate heaviness. In order to achieve this state, when the assist torque Ta is set at (¾)Tw, the twist angle $\theta$ of the Bowden cables 5, 6 becomes the target one quarter, but the steering torque Th also becomes one quarter, which is lighter than the one half that is targeted. For this reason, adding the difference between Tw/2 and Tw/4, that is, Tw/4, to the steering wheel 1 by means of the steering reaction force addition motor 17 can make the steering torque Th equal Tw/4+Tw/4=Tw/2, thereby regulating the heaviness of the steering wheel 1 to an appropriate state.

At this point, with regard to the equation (1) Tw=Th+Ta−Tr, since Th=Tw/2, Ta=(¾)Tw, and Tr=Tw/4, the equation is satisfied. That is, in equation (1) above, when the road surface torque Tw is constant, if the assist torque Ta is increased so as to decrease the twist angle $\theta$ of the Bowden cables 5, 6, increasing the steering reaction torque Tr accordingly can prevent a decrease in the steering torque Th corresponding to the heaviness of the steering wheel 1; conversely, if the assist torque Ta is decreased and the twist angle $\theta$ of the Bowden cables 5, 6 increases, decreasing the steering reaction torque Tr accordingly can prevent an increase in the steering torque Th corresponding to the heaviness of the steering wheel 1.

Next, control of the steering reaction force addition motor 17 and the power steering motor 24 based on the vehicle speed V is explained.

When the vehicle travels at low speed, it is desirable to increase the gain of the turning angle (steering gain) of the wheels WL, WR relative to the steering angle of the steering wheel 1 by decreasing the twist angle $\theta$ of the Bowden cables 5, 6, thereby making it easy to maneuver the vehicle. On the other hand, when the vehicle travels at high speed, it is desirable to enhance the roadholding of the vehicle by decreasing the steering gain. The steering gain is therefore increased when traveling at low speed by increasing the assist torque Ta so as to decrease the twist angle $\theta$ of the Bowden cables 5, 6, and the steering gain is decreased when traveling at high speed by decreasing the assist torque Ta so as to increase the twist angle $\theta$ of the Bowden cables 5, 6. However, since this makes the steering wheel 1 too light when traveling at low speed and too heavy when traveling at high speed, correction is made by generating the steering reaction torque Tr by means of the steering reaction force addition motor 17.

Figure 6:
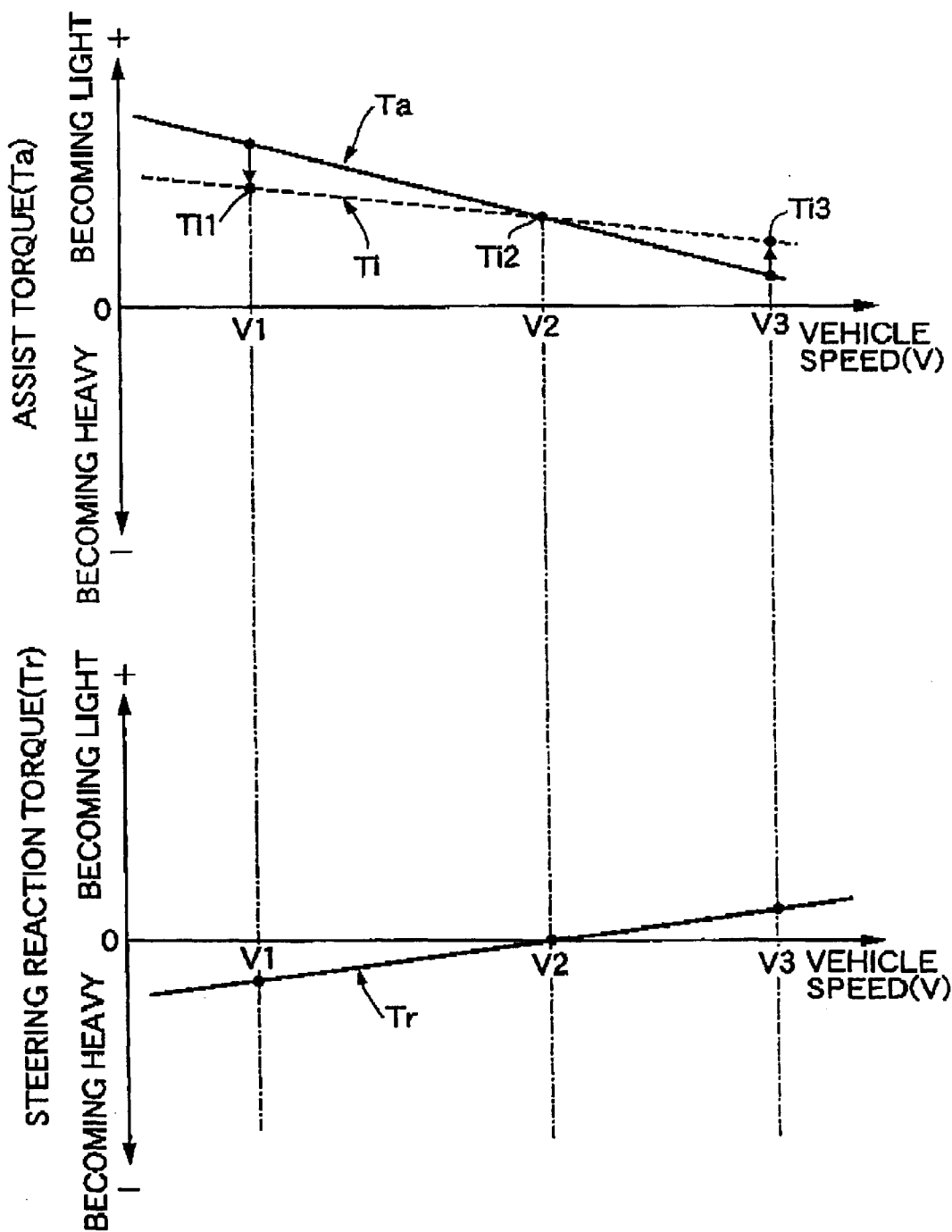

This is further explained by reference to FIG. 6. In the upper graph of the assist torque Ta, the broken line denotes an optimum assist torque Ti that gives an optimum steering feel, and this optimum assist torque Ti decreases in response to an increase in the vehicle speed V. When the vehicle is at a low speed V1, if the assist torque Ta denoted by the solid line is set so as to be larger than the optimum assist torque Ti in order to make it easy to maneuver the vehicle by increasing the steering gain, since the steering wheel 1 becomes too light, the steering reaction torque Tr is generated in a direction in which the steering wheel 1 becomes heavy as shown in the lower graph of the steering reaction torque Tr, so that the steering wheel 1 has a heaviness corresponding to the optimum assist torque Ti1.

When the vehicle is at a medium speed V2, since the assist torque Ta denoted by the solid line coincides with the optimum assist torque Ti2, the steering reaction torque Tr can be zero. When the vehicle is at a high speed V3, if the assist torque Ta denoted by the solid line is set so as to be smaller than the optimum assist torque Ti in order to enhance the roadholding of the vehicle by decreasing the steering gain, since the steering wheel 1 becomes too heavy, the steering reaction torque Tr is generated in a direction in which the steering wheel 1 becomes light as shown in the lower graph of the steering reaction torque Tr, so that the steering wheel 1 has a heaviness corresponding to the optimum assist torque Ti3.

When the steering wheel 1 is turned when the vehicle is at a standstill, by generating the steering reaction torque Tr by means of the steering reaction force addition motor 17 in a direction opposite to that described above, that is, by generating a torque by means of the steering reaction force addition motor 17 in the same direction as that of the power steering motor 24, the load on the driver can be lightened.

As described above, since the steering reaction force addition motor 17 is disposed between the steering wheel 1 and the Bowden cables 5, 6 and the power steering motor 24 is disposed between the Bowden cables 5, 6 and the wheels WL, WR, it is possible to prevent deterioration of the steering feel by generating the steering reaction torque Tr by means of the steering reaction force addition motor 17 so as to compensate for a change in the steering torque Th while regulating the change in steering responsiveness due to expansion and contraction of the Bowden cables 5, 6 by generating the assist torque Ta by means of the power steering motor 24 so as to change the steering torque Th.

An embodiment of the present invention is explained above, but the present invention can be modified in a variety of ways without departing from the spirit and scope of the present invention.

Figure 7:
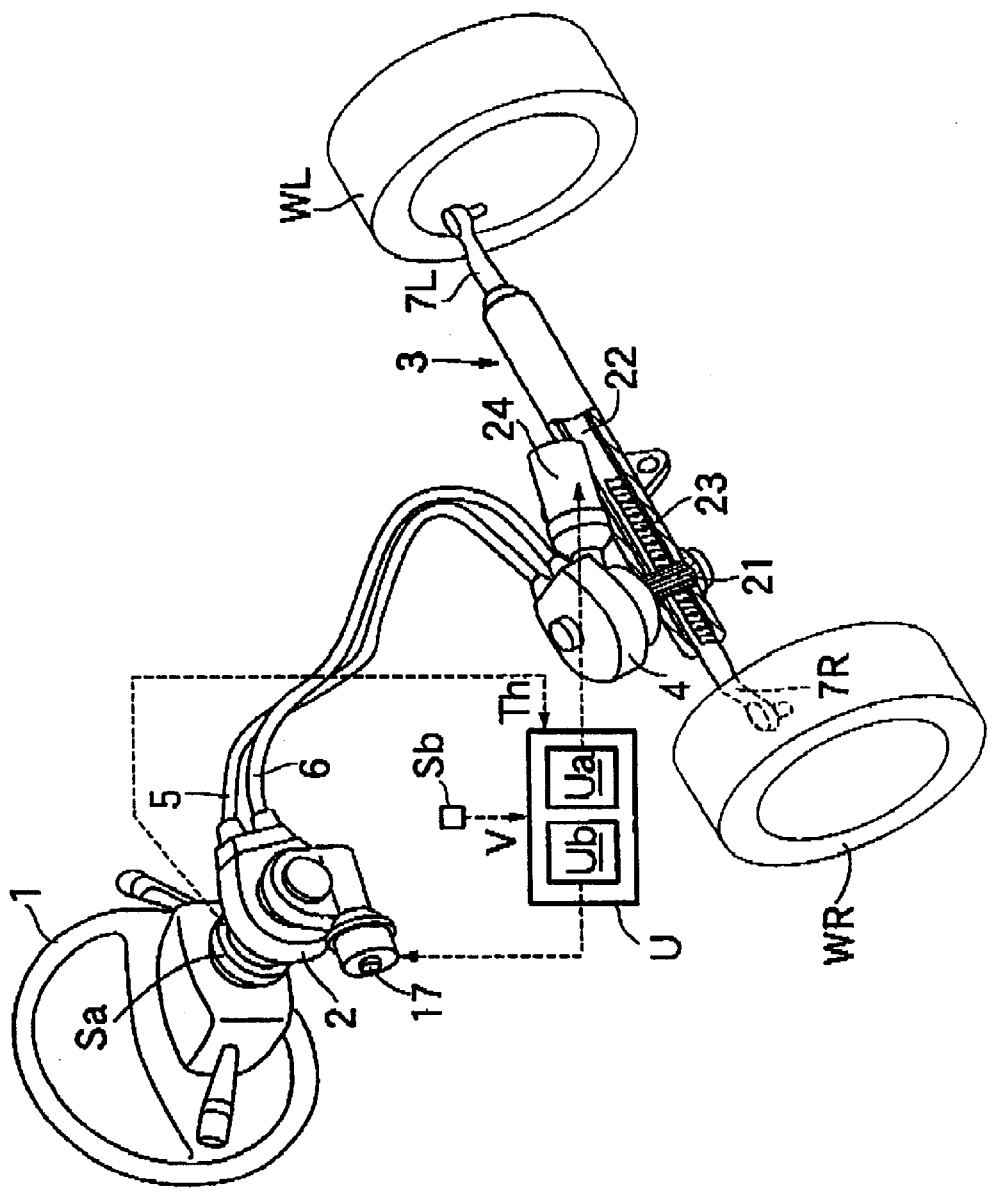
FIG. 7 is an overall perspective view of a cable steering system of a second embodiment.

For example, although the steering torque detection means Sa is disposed between the steering wheel 1 and the steering reaction force addition motor 17 in the first embodiment, in the second embodiment the steering reaction force addition motor 17 can be moved to the opposite side of the drive pulley housing 2 as shown in FIG. 7.

Figure 8:
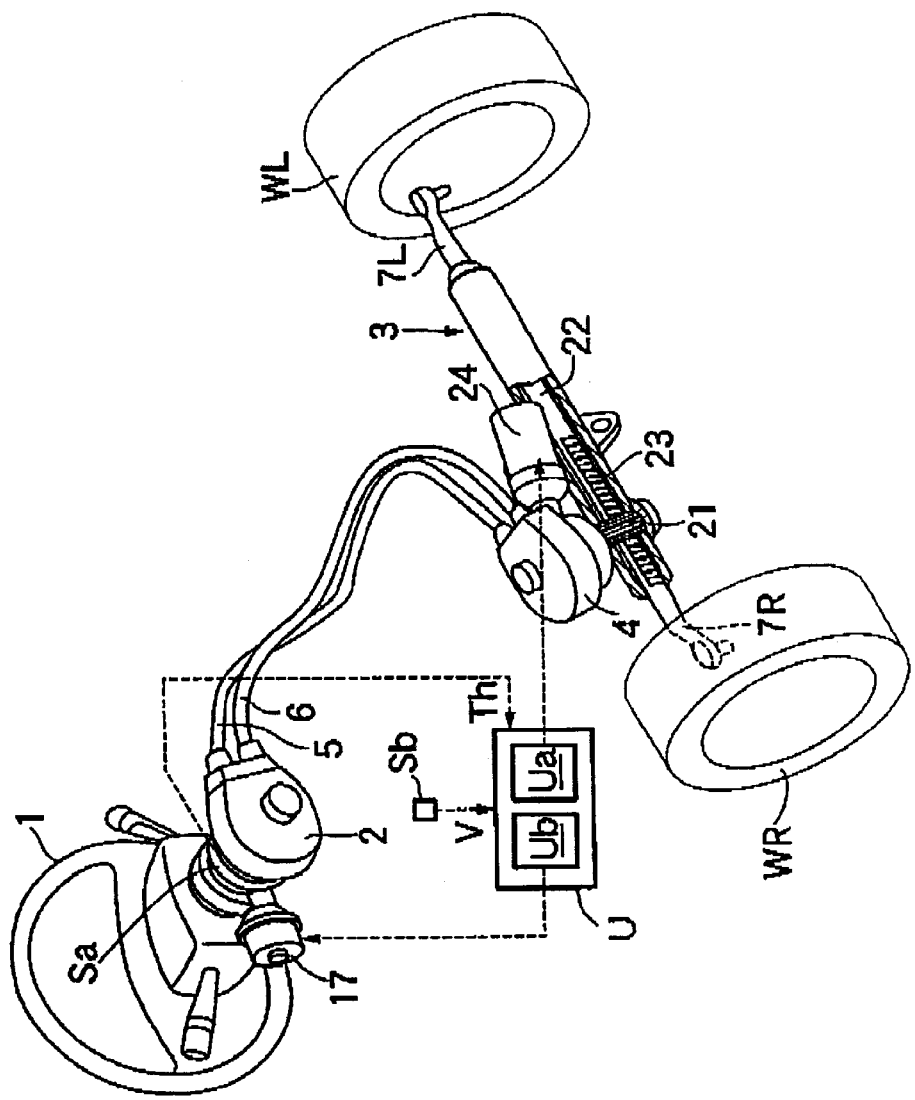
FIG. 8 is an overall perspective view of a cable steering system of a third embodiment.

Furthermore, as in the third embodiment shown in FIG. 8, the steering reaction force addition motor 17 can be disposed between the steering wheel 1 and the steering-torque detection means Sa. In this case, the steering torque that is detected by the steering torque detection means Sa equals a value obtained by subtracting a steering reaction torque Tr from a steering torque Th that is input into the steering wheel 1 by a driver.

What is claimed is:

1. A cable steering system comprising:

a cable that transmits to a steering gearbox a steering torque applied to a steering wheel;

steering torque detection means that detects the steering torque, the steering torque detection means being disposed between the steering wheel and the cable;

assist means disposed between the cable and a wheel, the assist means assisting a steering operation by a driver;

first control means that controls operation of the assist means based on the steering torque;

steering reaction force addition means disposed between the steering wheel and the cable, the steering reaction force addition means applying a steering reaction torque to the steering wheel; and second control means that controls operation of the steering reaction force addition means.

2. The cable steering system according to claim 1 wherein, in a low vehicle speed region, the first control means controls the assist means so as to increase an assist torque and the second control means controls the steering reaction force addition means so as to increase the steering reaction torque and, in a high vehicle speed region, the first control means controls the assist means so as to decrease the assist torque and the second control means controls the steering reaction force addition means so as to decrease the steering reaction torque.

3. The cable steering system according to claim 2 wherein, when the vehicle is at a standstill, the steering reaction force addition means assists a steering operation by the driver in cooperation with the assist means.

4. The cable steering system according to claim 1 wherein, when the vehicle is at a standstill, the steering reaction force addition means assists a steering operation by the driver in cooperation with the assist means.

5. The cable steering system according to claim 1 wherein the steering torque detection means is disposed between the steering wheel and the steering reaction force addition means.

6. The cable steering system according to claim 1 wherein the steering torque detection means is disposed between the steering reaction force addition means and the cable.

* * * * *